US 6,979,126 B2

(12) United States Patent
Matsumoto

(10) Patent No.: US 6,979,126 B2
(45) Date of Patent: Dec. 27, 2005

(54) LINEAR GUIDE APPARATUS

(75) Inventor: Jun Matsumoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 33 days.

(21) Appl. No.: 10/830,024

(22) Filed: Apr. 23, 2004

(65) Prior Publication Data
US 2004/0240757 A1    Dec. 2, 2004

(30) Foreign Application Priority Data
Apr. 23, 2003 (JP) ............................ P.2003-118895

(51) Int. Cl.⁷ ............................................. F16C 29/06
(52) U.S. Cl. ........................................................ 384/44
(58) Field of Search ............................. 384/44, 43, 45; 464/168

(56) References Cited

FOREIGN PATENT DOCUMENTS

JP    5-280537 A    10/1993

*Primary Examiner*—Lenard A. Footland
(74) *Attorney, Agent, or Firm*—Sughrue Mion, PLLC

(57) ABSTRACT

Slider side track faces are inclined relative to rail side track faces in a no load state by predetermined included angles which cancel amounts of inclinations of elastic deformation by a preload such that the track faces opposed to each other are in parallel with each other in a state of being loaded with the preload.

2 Claims, 8 Drawing Sheets

INCLINATION AMOUNT

PLANE PERPENDICULAR TO AXIAL LINE OF DRESSER

LINEAR GUIDE APPARATUS

BACKGROUND OF THE INVENTION

1. Field of the Invention

The present invention relates to a linear guide apparatus used in various machines of a manufacturing apparatus, a working machine, a measuring instrument and the like.

2. Description of the Related Art

A linear guide apparatus is an apparatus for linearly guiding an object to be guided, not illustrated, fixed to a slider as disclosed in, for example, JP-A-5-280537. As shown by FIG. 14, a linear guide apparatus is provided with a guide rail 1 and a slider. The slider 2 has a section substantially in a U-like shape riding over the guide rail 1 and is attached with the object to be guided. As shown by FIG. 8A, guide rail side trace faces 3, 4 are formed at side faces of the guide rail 1, and slider side track faces 5, 6 are formed at inner peripheral faces of leg portions of the slider 2. A load portion track path is formed by arranging the guide rail side trace faces 3, 4 and the slider side track faces 5, 6 opposedly to each other. Circulation passages are formed at end caps 50 and at inside of the slider 2. Both of the load portion track path and the circulation passages form an endless circulation passage for rollers. A plurality of cylindrical rollers are arranged at inside of the endless circulation passage and the plurality of cylindrical rollers are rolled at inside of the endless circulation passage in accordance with relative movement of the slider 2. Further, as described above, the linear guide apparatus is used in various machines of a semiconductor manufacturing apparatus, a precision working machine, a precision measuring instrument and the like.

Here, as shown by FIG. 8B, in the guide rail side track faces 3, 4 and the slider side trace faces 5, 6 opposed to each other, the track faces of the guide rail 1 and the slider 2 are worked to finish such that the two track faces constitute faces in parallel with each other in view from an axial direction of the guide rail 1 in a no load state in which the rollers are not interposed thereto.

The linear guide apparatus in which rolling elements are the cylindrical rollers is frequently used for use needing a high rigidity particularly in a machine tool or the like. Therefore, in order to achieve a sufficient rigidity, the rollers are interposed between the track faces opposed to each other by being applied with a sufficient preload.

However, by the preload, the slider 2 is elastically deformed to open left and right leg portions 2A. FIG. 5 shows a result of calculating a state of the elastic deformation by an FEM analysis. As shown by FIG. 5B, left and right sides of a horizontal portion 2B are warped to an upper side and deformed in a shape of opening a total of the left and right leg portions 2A. Therefore, in a state of bringing the linear guide into a usable state by interposing the cylindrical rollers, the slider side track faces 5, 6 are inclined by a predetermined angle relative to the guide rail side track faces 3, 4.

A degree of the inclination differs by loading an external load from the object to be guided or the like. FIG. 5C shows a result in consideration of the external load.

According to the linear guide apparatus of the related art, in a state of use interposing the rollers, the pairs of track faces opposed to each other are not in parallel with each other and therefore, contact pressures between the rollers and the respective track faces are not distributed uniformly but distributed unevenly and the pressures differ depending on contact positions. FIG. 9 shows a result of calculating a state of distributing the contact pressure between the roller and the track in a direction of a roller axis. Running life of a total of the linear guide apparatus is significantly dependent on running life of a portion of the roller at which the contact pressure is the largest. That is, when there is a deviation in the distribution of the contact pressure as shown by FIG. 9, a face pressure of a portion of the roller is abnormally increased to thereby shorten the life of the total of the linear guide apparatus. Further, when the roller is brought into an uneven contact state in this way, there is a concern of effecting an influence on an attitude of the rolling roller.

Meanwhile, in order to reduce an inclination between the track faces by such a deformation of the members, there is conceivable a method of increasing a rigidity of the members. However, for increasing the rigidity, it is necessary to increase a dimension of the member, which hinders compact formation of the apparatus.

SUMMARY OF THE INVENTION

It is an object of the present invention to provide a linear guide apparatus capable of achieving to prolong running life of the linear guide apparatus using a cylindrical roller as a rolling element, by only adjusting an initial inclination of a track face.

In order to resolve the above-described problem, there is provided a linear guide apparatus according to a first aspect of the present invention, the liner guide apparatus comprising;

a guide rail including a track face extended in an axial direction;

a slider including a track face opposed to the track face of the guide rail and movable relative to the guide rail; and a plurality of cylindrical rollers being interposed between the track faces opposed to each other by being applied with a predetermined preload and being rolled in accordance with a relative movement of the slider to the guide rail, wherein one of the track faces opposed to each other is inclined to the other of the track faces relatively in an initial state of no load in which the cylindrical rollers are not interposed between the track faces by an inclined angle which cancels or reduces an amount of inclination of the track faces by a deformation of a member such that the track faces opposed to each other are in parallel with each other or substantially in parallel with each other in a state in which the member is deformed by being loaded with at least one of an external load to be loaded in using the linear guide and the preload.

Further, there is provided a a linear guide apparatus according to a second aspect of the present invention, the linear guide apparatus comprising:

a guide rail including a track face extended in an axial direction;

a slider including a track face opposed to the track face of the guide rail and movable relative to the guide rail; and a plurality of cylindrical rollers being interposed between the track faces opposed to each other by being applied with a predetermined preload and being rolled in accordance with a relative movement of the slider to the guide rail, wherein at least one of the track faces is inclined from a reference track face in an initial state of no load in which the cylindrical rollers are not interposed between the track faces by an inclined angle which cancels or reduces an amount of inclination from the reference track face produced by a deformation of a member by being loaded with at least one of an external load to be loaded in using the linear guide and the preload.

DETAILED DESCRIPTION OF THE INVENTION

An explanation will be given of an embodiment according to the present invention in reference to the drawings as follows.

Figure 1:
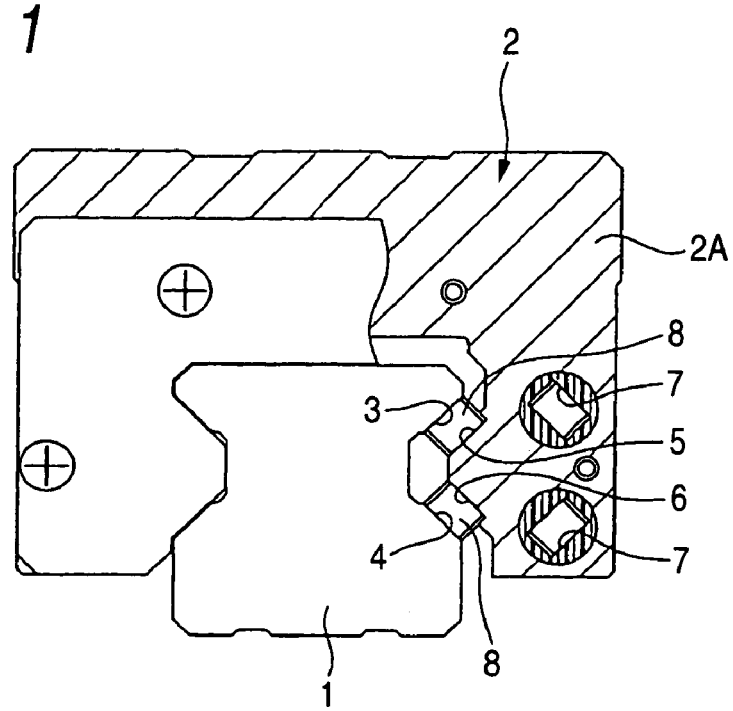
FIG. 1 is a partially disassembled view showing a linear guide apparatus according to an embodiment of the present invention.

A basic constitution of a linear guide apparatus of the embodiment is similar to that of the related art. As shown by FIG. 1, a slider 2 substantially in a U-like shape rides over a guide rail 1 and is made to be movable along the guide rail 1 relatively thereto. Left and right side faces of the guide rail 1 are formed with a total of four tracks of respective two tracks of guide rail side track faces 3, 4. Further, slider side track faces 5, 6 are formed at positions of inner peripheral portions of leg portions of the slider 2 opposedly to the respective guide rail side track faces 3, 4. Notation 7 designates a rolling element return path.

A plurality of cylindrical rollers 8 are arranged on load rolling paths comprising the guide rail side track faces 3, 4 and the slider side track faces 5, 6 opposed to each other along the load rolling path with a predetermined preload. In the case of being operated, the cylindrical rollers 8 are rolled on the load rolling paths.

Figure 2:
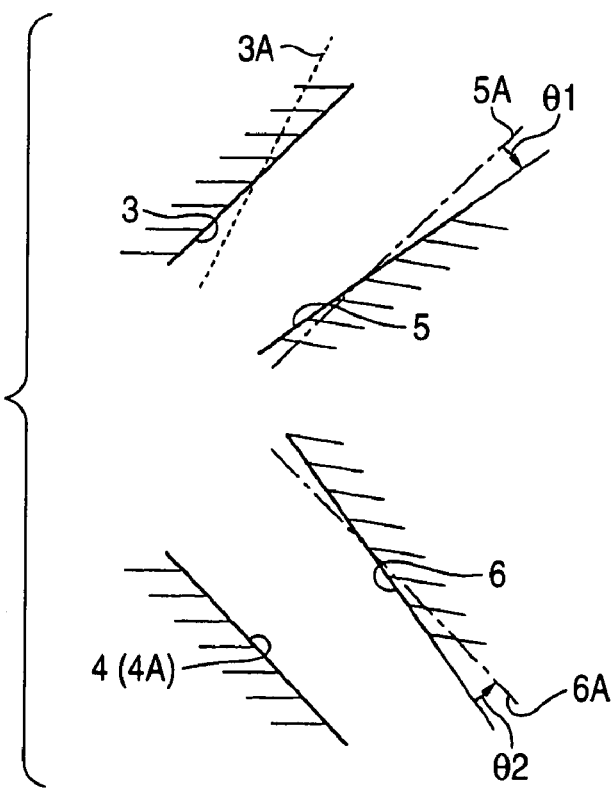
FIG. 2 is a view showing a relationship between track faces opposed to each other according to the embodiment of the present invention.

According to the embodiment, as shown by FIG. 2, the slider side track faces 5, 6 in a no load state before interposing the roller 8 are worked such that positions 3A, 4A of the guide rail side track faces and positions 5A, 6A of the slider side track faces are in parallel with each other in a state of being deformed by the preload. That is, the slider side track faces 5, 6 in a no load state are worked to constitute faces which are inclined, by initial inclined angles of $\theta_1$, $\theta_2$, from faces 5A, 6A.

Figure 3:
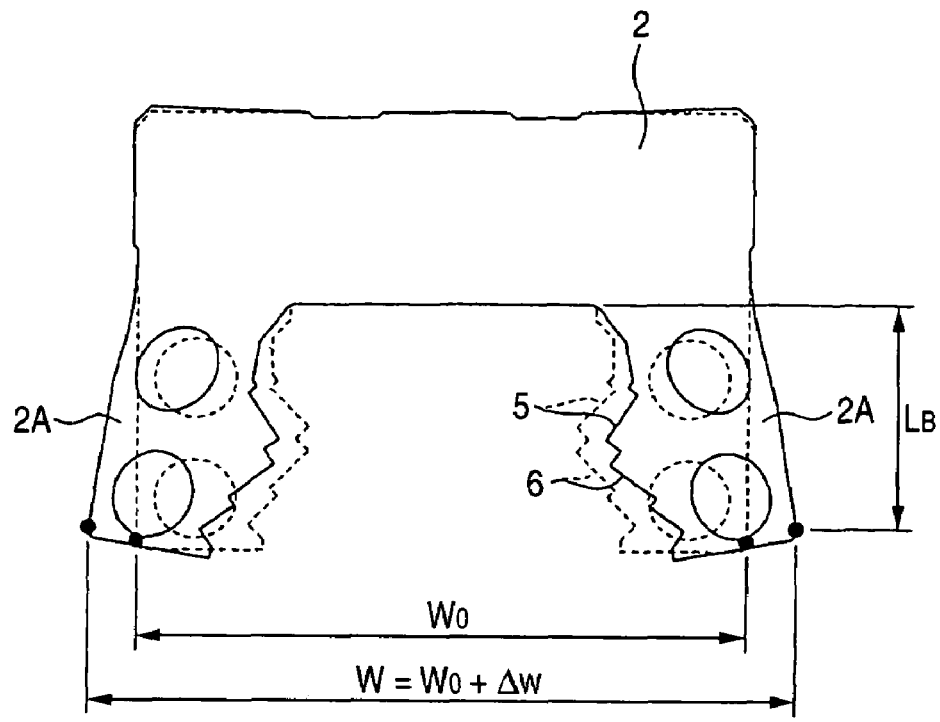
FIG. 3 is a view showing elastic deformation of a slider according to the embodiment of the present invention.
Figures 4A, 4B:
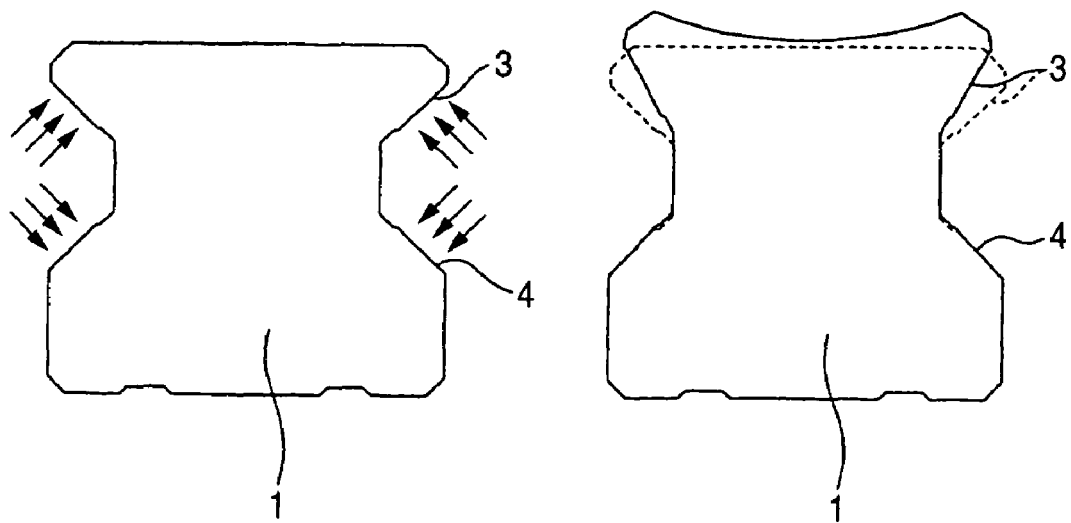
FIGS. 4A and 4B illustrate views showing elastic deformation of a rail according to the embodiment of the present invention.

For example, when attention is paid to the side of the slider 2, as shown by FIG. 3, by elastically deform to open the left and right leg portions 2A by the preload, both of the upper side track face 5 and the lower side track face 6 are brought into a state that they pivot by a predetermined angle in a counterclockwise direction relative to positions of the track faces under no load. Further, when attention is paid to the side of the guide rail 1, by elastically deforming left and right portions on an upper side to warp to an upper side as shown by FIG. 4B by being loaded as shown by FIG. 4A by the preload, the upper side back face 3 is brought into a state that it pivots by a predetermined angle in a counterclockwise direction relative to the position of the track face under no load. The lower side track face 4 is hardly changed by presence or absence of the preload. Further, the guide rail sidetrack faces 3, 4 in the no load state are set to reference track faces constituting references as in the related art. In contrast, with regard to the slider side track faces 5, 6, the track faces 5, 6 are worked into faces which are inclined by predetermined initial inclined angles relative to reference track faces constituting a reference as shown in FIG. 2. That is, the upper side track face 5 is worked into a face inclined relative to a reference track face (not illustrated) by an initial inclined angle, which cancels amounts of inclinations of both of the guide rail side track face 3 and the slider side track face 5 due to deformation. Similarly, the lower side track face 6 is worked into a face inclined relative to a reference track face (a face designated by notation 6A) by an initial inclined angle, which cancels an amount of inclination produced by deforming a member of the slider side trace face 5.

Here, the amounts of inclinations by the elastic deformation from the reference track faces in the no load state may be calculated by an analysis of a finite element method or the like or may be provided by an experiment.

Further, an investigation is carried out on the applied preload and the amounts of inclinations of the respective track faces by deforming the members and it is confirmed that they are substantially in a linearly proportional relationship. Therefore, a relationship shown below may previously be established with regard to a linear guide having a corresponding type and dimension and an initial inclined angle relative to an applied preload may be determined from the relationship.

$$\text{initial inclined angle} = K_1 \times (\text{preload}) + K_2$$

where notations K1, K2 are coefficients.

Thereby, in the no load state, there is brought about a state in which in the respective track faces opposed to each other, the slider side track faces 5, 6 are inclined relative to the guide rail side track faces 3, 4.

Further, when the respective roller 8 are interposed, with a previously set preload, between the respective track faces opposed to each other of the guide rail 1 and the slider 2 set in the above-mentioned way, the slider 2 and the guide rail 1 are respectively deformed as described above and the track faces 3A, 5A and 4A, 6A opposed to each other are brought into a state in parallel with each other or a state of being substantially in parallel with each other. As a result, in a state of using the linear guide apparatus, contact face pressure distributions between the respective track faces and the rollers become uniform or deviations in the contact face pressure distributions are restrained to be small, and uneven contact of the roller 8 is restrained.

Thereby, running life of a total of the linear guide apparatus can be prevented from being shortened.

Further, unnecessary fluctuation can also be-prevented when the roller 8 is rolled along the rolling path since the contact face pressure distributions in the respective track faces and the rollers are substantially uniform. When the deviations in the contact face pressure distributions are significant, there is a concern of bringing about the unnecessary fluctuation in the rolling roller 8.

Figure 5A:
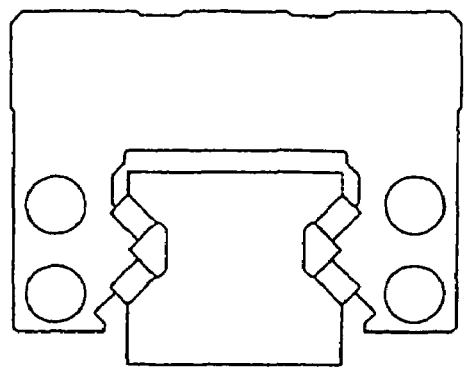
FIGS. 5A to 5C illustrate views showing the elastic deformation of the slider according to the embodiment of the present invention.
Figure 5B:
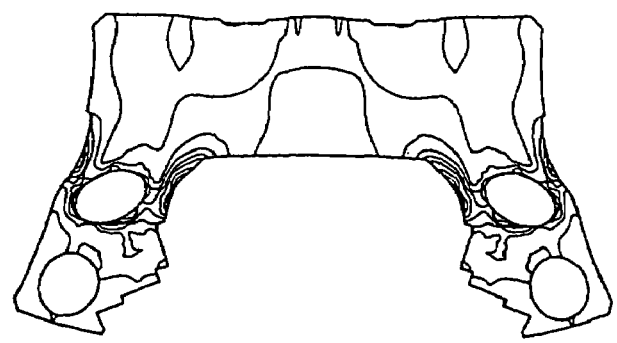
Figure 5C:
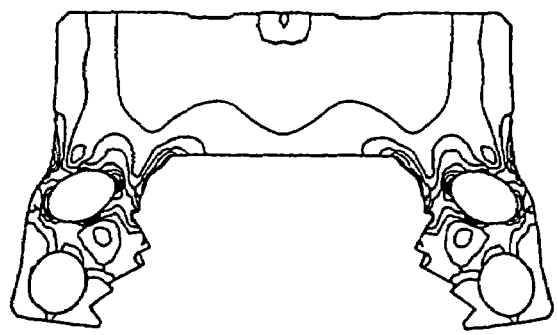

Here, although in the above-described embodiment, a consideration is given only to the elastic deformation of the members by the preload in interposing the rollers, the embodiment is not limited thereto. The inclined angle may be determined by adding also elastic deformation by an external load produced by a self weight of the slider 2 per se or an object or the like attached to the slider 2. However, an object to be guided (machine apparatus) is normally attached to an upper face of the slider 2 and therefore, the object to be guided is operated to restrain deformation of an upper face of the horizontal portion of the slider 2 as shown by FIGS. 5B through 5C and under a normal condition of use, a rate of contributing to deformation of the track faces by the external load is small. Therefore, in order to determine the initial inclined angle, generally, when a consideration is given to only the preload, the constitution is sufficient. Naturally, a further ideal initial inclined angle may be calculated by taking a consideration also to the external load.

Further, although according to the embodiment, only the slider side track faces 5, 6 are inclined from the reference track faces such that the respective inclined amounts from the faces under no load are canceled by loading the preload to the guide rail side track faces 3, 4 and the slider side track faces 5, 6 to thereby set the guide rail side track faces 3, 4 and the slider side track faces 5, 6 after deformation to be in parallel with each other, the embodiment is not limited thereto. Only the guide rail side track faces 3, 4 may be inclined from the reference track faces or the guide rail side track faces 3, 4 and the slider side track faces 5, 6 may respectively be distributed with inclinations by a predetermined distributing rate to thereby incline the both from the reference track faces to thereby cancel the respective inclined amounts from the faces under no load by loading the preload to the guide rail side track faces 3, 4 and the slider side track faces 5, 6.

Or, the guide rail side track faces 3, 4 and the slider side track faces 5, 6 may be worked respectively to faces inclined relative to individual reference track faces constituting a target determined by design or the like (inclination in a direction reverse to inclination by deformation) under a no load state before interposing the roller 8 to thereby cancel amounts of inclinations produced by elastic deformation of a member (slider 2 or guide rail 1) by loading the preload in interposing the roller 8. Also thereby, in the state of loading the preload, the guide rail side track faces 3, 4 and the slider side track faces 5, 6 opposed to each other are in parallel with each other or substantially in parallel with each other and the deviations in the contact face pressures between the respective track faces and the roller can be restrained in the state of interposing the roller 8. Further, in the case, the respective target reference track faces can be constituted by the respective track faces when the rollers a are interposed and therefore, there is also achieved an effect of capable of constituting a desired inclination by the inclination of the interposed rollers.

Further, according to the embodiment, an explanation has been given of a case of canceling also the amounts of inclination of the track faces on the side of the guide rail 1 by the side of the slider 2 also in consideration of elastic deformation on the side of the guide rail 1 as well as the slider 2. Inclination of the guide rail side track faces 3, 4 by deformation of the guide rail 1 is smaller than inclination of the track faces by deformation on the side of the slider 2 (for example, corresponding to 20 through 30% thereof). This is because whereas since the slider 2 is the member substantially in the U-like shape, the slider 2 is liable to deform to open the left and right legs, the member of the guide rail 1 is substantially in a rectangular shape and the member is provided with a comparatively large rigidity. Therefore, it seems that even when the inclination by the elastic deformation of the track faces 3, 4 on the side of the guide rail 1 is disregarded, it is practically allowable. That is, only the slider side track faces 5, 6 may be inclined by taking a consideration only to the elastic deformation on the side of the slider 2.

EXAMPLES

Example 1

With Regard to an Amount of Inclination

With regard to a linear guide having the above-described constitution and including 4 rows of rolling element rows, as main dimensions, a width of the guide rail 1 is set to 35 mm, a height from a bottom face of the guide rail 1 to an upper face of the slider 2=55 mm, a width of the slider 2=70 mm, a length of the slider 2=112 mm, a diameter of rolling element=4 mm, a length of rolling element=6 mm and the following is carried out.

In the example, as shown by FIG. 2, as shown by FIG. 2, the side of the slider side track faces 5, 6 is inclined by the predetermined initial inclined angle to cancel the amounts of inclinations by deformation respectively produced at the guide rail side track faces 3, 4 and the slider side track faces 5, 6. In the example, the initial inclined angle is determined as follows.

In a state of assembling the linear guide apparatus, the roller 8 is applied with a preload. Although the magnitude of the preload differs by use of the linear guide apparatus, in the example, the preload is set to 8000 N. Further, the slider 2 is operated with a downward load of 5000 N as the self weight. Further, a state of deforming the slider 2 and the guide rail 1 when the preload is operated can be calculated by a publicly-known analysis method of an FEM analysis or the like. FIG. 5B is a view of a result of calculating the deformation of the member of the slider 2 by an FEM analysis. As a result, amounts of inclinations of the upper side track face and the lower side track face of the slider 2 by deformation of the members is $6.7 \times 10^{-4}$ rad in an average of upper and the lower members. At this occasion, when an analysis is carried out by disregarding the self weight of the slider 2, the average of the upper and lower side members is $6.8 \times 10^{-4}$ rad. That is, contribution by the self weight of the slider 2 is small.

From the result, in the example, the initial inclined angles of the slider side track faces 5, 6 disregarding deformation of the side of the guide rail 1 may be constituted by $6.8 \times 10^{-4}$ rad (a direction of the initial inclined angle is reverse to a direction inclined by deformation) both in the upper side and the lower side members. As is known from FIG. 5, a total of the leg portions is deformed to integrally open and therefore, the amounts of inclinations of the upper side track face and the lower side track face by deforming the members are substantially the same value.

Although in the above-described, the inclined angle is calculated by the FEM analysis, the inclined angle can also be provided experimentally. That is, as shown by FIG. 3, there is measured a difference $\Delta W$ between before and after assembling (before and after applying the preload) of a width direction of the leg portions of the slider 2. In measurement, a measuring instrument of a passer meter or the like is used. Further, an inclined angle $\theta$ of the track face by deforming the member can approximately be calculated by the following equation.

$$\theta = \Delta W/(2 \times Lb)$$

In the example, an opening amount when the inclinations are not provided $\Delta W = 42 \mu m$, $Lb = 28$ mm and therefore, from the above equation, $\theta = 7.5 \times 10^{-4}$ rad which is a value proximate to the value by the FEM analysis.

Here, when the calculation result of the FEM analysis and the experimentally provided value are compared with regard to other linear guide members having various dimensions, the both substantially coincide with each other. Further, also in cases of a square shape and a flange shape as the shape of the slider 2, the both substantially coincide with each other similarly. Therefore, the amount of deforming the slider 2 can be predicted by calculation by the finite element method with excellent accuracy. From the result, also with regard to an amount of inclination of the track face by deforming the member, the both may be regarded to coincide with each other by experiment and analysis with sufficient accuracy. When the FEM analysis is utilized, an initial inclined angle relative to the reference track face can be determined without trial fabrication and measurement of a product. Therefore, a time period and cost for trial fabrication and measurement can be reduced.

Further, although in the above-described explanation, an explanation has been given only of the slider 2, the initial inclined angle relative to the reference track face is determined by calculating the initial inclined angle by the FEM analysis also with regard to deformation of the member on the side of the guide rail 1. The condition is the same as the above-described. As an analysis result, amounts of inclination of the upper side track face and the lower side track face by deforming the members are respectively $+1.1 \times 10^{-4}$ rad on the upper side and $-0.1 \times 10^{-4}$ rad on the lower side (clockwise direction is positive as sign).

The amount of inclination on the side of the guide rail 1 may be dealt with by inclining the track faces on the side of the guide rail 1 from the reference track faces, or the slider side track face 5, 6 opposed there to may be inclined from the reference track faces by adding also the amounts of inclinations on the side of the guide rail 1. When the inclination is absorbed by the slider side track faces 5, 6, the slider side track faces 5, 6 are worked to incline in a direction reverse to a direction of being inclined by deformation from the reference track faces such that in the slider side track faces 5, 6, the initial inclined angle of the upper side track face = $6.8 \times 10^{-4} - 1.1 \times 10^{-4} = 5.7 \times 10^{-4}$ rad and the initial inclined angle of the lower side track face = $6.8 \times 10^{-4} + 1.1 \times 10^{-4} = 6.9 \times 10^{-4}$ rad. Further, in this case, the initial inclined angles of the upper side track face and the lower side track face differ from each other and therefore, working is carried out by inclining, for example, a shaping grindstone individually such that the track faces are inclined by the respective initial inclined angles from the reference track faces by a unit of each track face, or working is carried out by using a shaping grindstone formed by a rotary dresser having different inclined angles for the upper and lower track faces. Further, the initial inclined angles of the upper and lower track faces may be set to $6.3 \times 10^{-4}$ rad by taking an average of the both. Even by setting in this way, the deviation in the contact face pressure distribution between the roller 8 and the track face is alleviated.

Here, when the preload is changed from 8000 N, mentioned above, to 12000 NN by a multiplication factor of 1.5, the initial inclined angle of the upper side track face on the side of the slider 2 maybe set to $1.5 \times 5.7 \times 10^{-4}$ rad = $8.6 \times 10^{-4}$ rad and the initial inclined angle of the lower side track face may be set to $1.5 \times 6.9 \times 10^{-4}$ rad = $10.3 \times 10^{-4}$ rad.

Figure 8B:
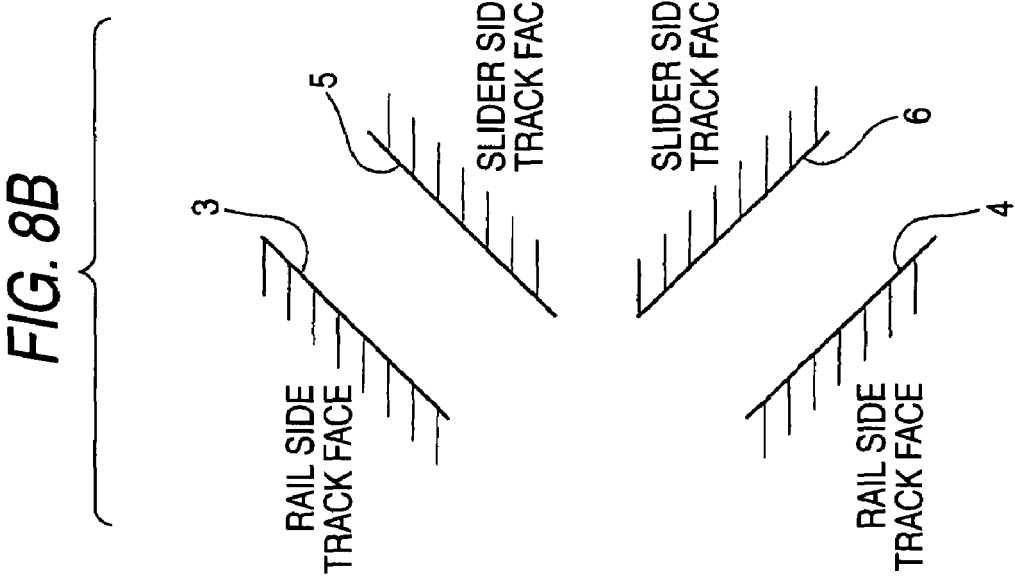
FIGS. 8A and 8B illustrate views showing a relationship between track faces opposed to each other of an example of a related art.
Figure 8A:
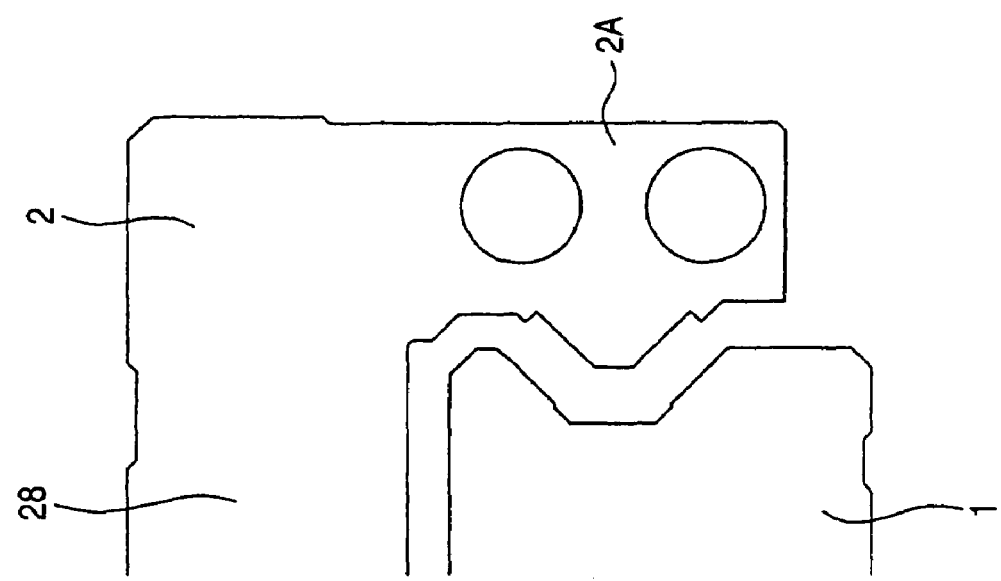

Further, in order to compare the embodiment with the related art, Comparative Example 1 by the related art is used. In Comparative Example 1, as shown by FIG. 8, in a state in which the preload is not applied, the track faces of the guide rail 1 and the slider 2 are in parallel with each other constituting inclinations equal to those of reference trace faces constituting a target. Otherwise, dimensions of the linear guide apparatus of Example 1 and Comparative Example, 1 are the same.

Figure 9:
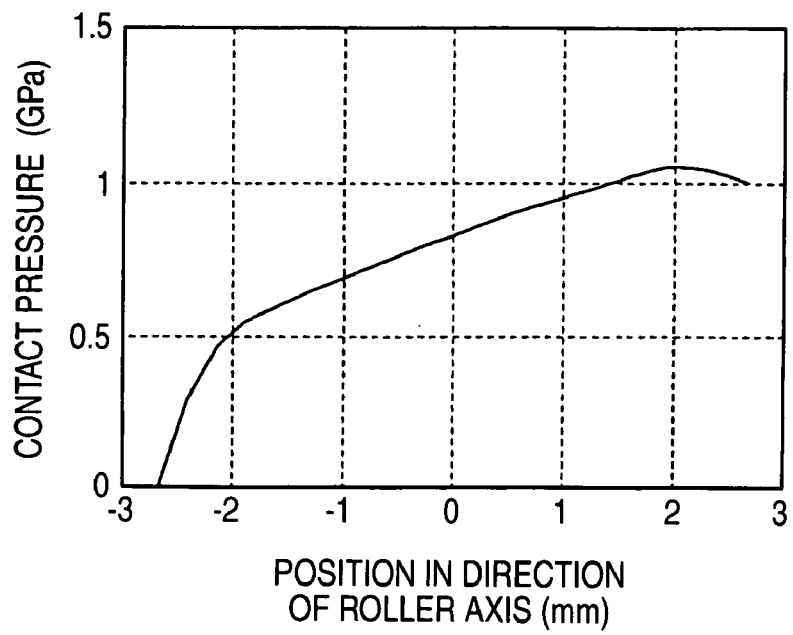
FIG. 9 is a diagram showing a distribution of a contact face pressure in the example of the related art.
Figure 10:
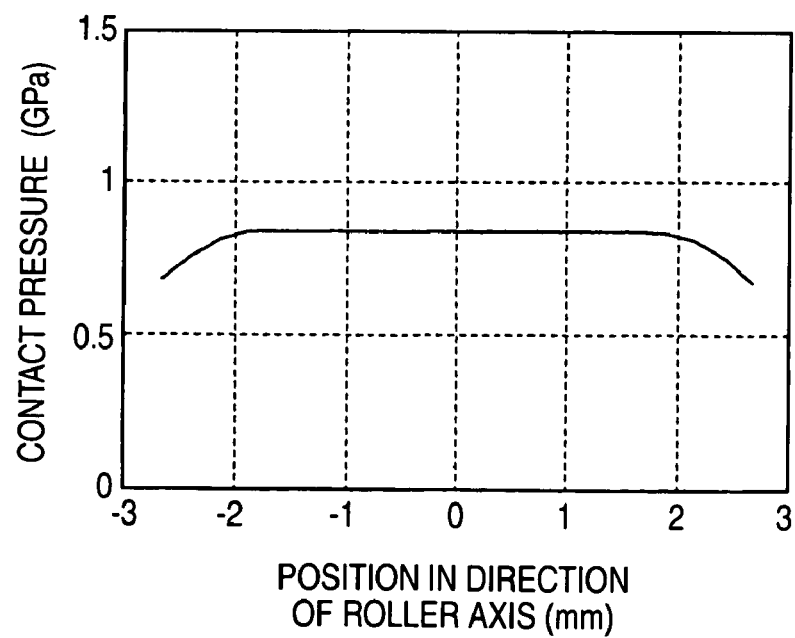
FIG. 10 is a diagram showing a distribution of a contact face pressure according to the embodiment of the present invention.

The contact pressure distributions between the rollers 8 and the track faces when the rollers 8 are interposed therebetween in the Example 1 and Comparative Example 1 are respectively provided. FIG. 9 shows the contact pressure distribution of Comparative Example 1 (by the related art), which is not preferable since the deviation in the contact pressure is large and the life is shortened. Meanwhile, in the contact pressure distribution of the Example 1, as shown by FIG. 10, the deviation in the contact pressure is small. Therefore, the life can be prevented from being shortened.

Example 2

With Regard to Working of a Track Face

Two track faces disposed at the inner peripheral faces of the leg portions of the slider 2 are simultaneously worked by using a shaping grindstone 40.

First, an outer peripheral face of the shaping grindstone 40 is formed by a rotary dresser 41 accuracy of which is correctly controlled to a shape of finishing the inner peripheral faces of the leg portions of the slider 2 (shapes of track faces are set by inclinations of reference track faces).

At this occasion, a face in correspondence with the track face constituting the inclination of the reference track face is transcribed to the grindstone 40 by making a shaft of the rotary dresser 41 and a rotating shaft of the grindstone 40 in parallel with each other and pressing the outer periphery of the grindstone 40 to the rotary dresser 41 to form.

Figure 11:
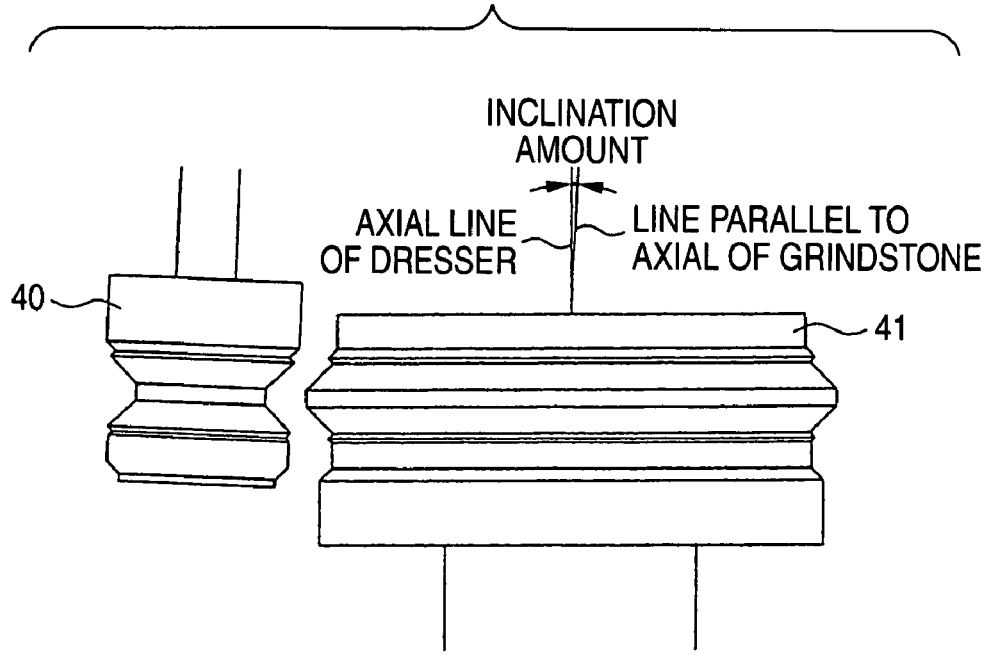
FIG. 11 is a view showing a working method according to the embodiment of the present invention.

In contrast thereto, according to the embodiment, as shown by FIG. 11, the outer periphery of the grindstone 40 is pressed to the rotary dresser 41 to form by bringing the shaft of the rotary dresser 41 into a state of being inclined thereto by the initial inclined angle. Thereby, the grindstone 40 is transcribed with the face in correspondence with the track face inclined to the reference track face by the initial inclined angle. In place of inclining the rotary dresser 41, the rotating shaft of the shaping grindstone may be inclined by the initial inclined angle to form. The inclined angle is, for example, $6.8 \times 10^{-4}$ rad in the case of Example 1.

Further, by working to finish the inner peripheral faces of the two leg portions of the slider 2 by the shaping grind stone 40, both of the upper side track face and the lower side track face are worked to finish to the track faces inclined from the reference inclined angles by the initial inclined angles.

Here, although in the above-described explanation, the face of the shaping grindstone 40 is formed in the shape of the face in correspondence with the track faces inclined from the reference track faces by the initial inclined angles, the embodiment is not limited thereto.

For example, similar to the related art, the shaping grindstone 40 is formed by making the shaft of the rotary dresser 41 and the rotating shaft of the shaping grindstone 40 in parallel with each other, the grindstone 40 is transcribed with the face in correspondence with the track faces constituting the inclinations of the reference track faces. Further, in working to finish the inner peripheral faces of the leg portions on the slider side 2, as shown by FIG. 12 and FIG. 13, the rotating shaft of the shaping grindstone 40 or a work (slider 2) is inclined by the initial inclined angle.

By the above-described working, both of the two upper and lower track faces on the leg portion of the slider 2 on one side can be worked to the track faces inclined to the reference track faces by the desirable initial inclined angles.

Also with regard to the guide rail side track faces 3, 4, the upper side track face is worked to the track face inclined from the reference track face by the initial inclined angle by similar working.

Figure 12:
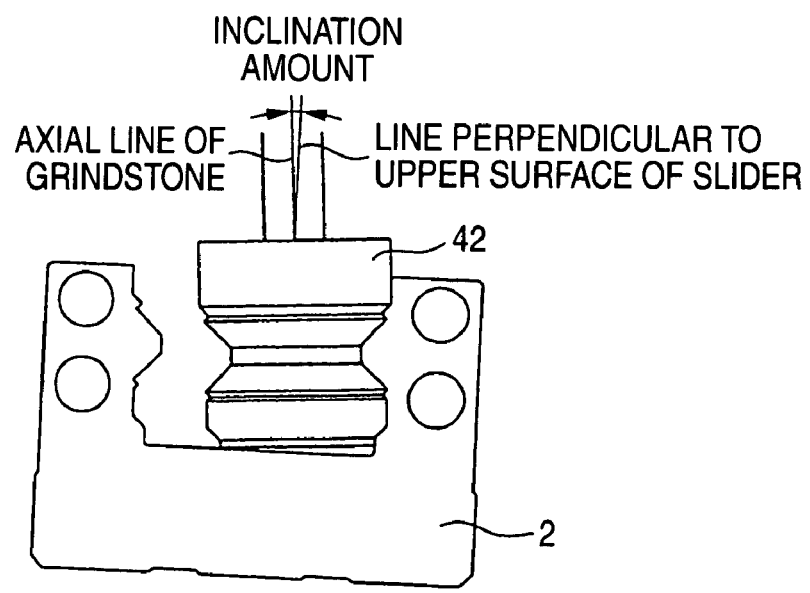
FIG. 12 is a view showing the working method according to the embodiment of the present invention.
Figure 13:
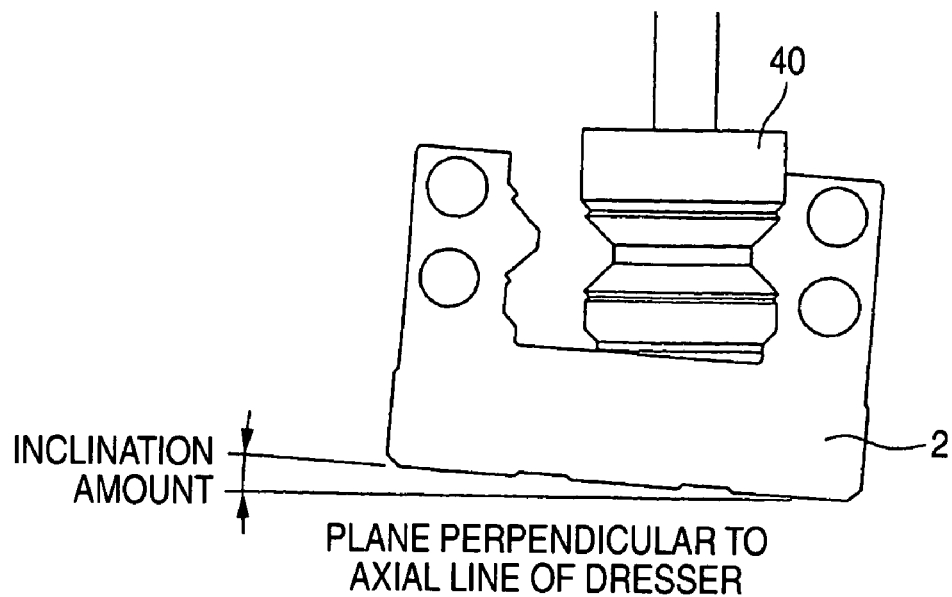
FIG. 13 is a view showing the working method according to the embodiment of the present invention.
Figure 14:
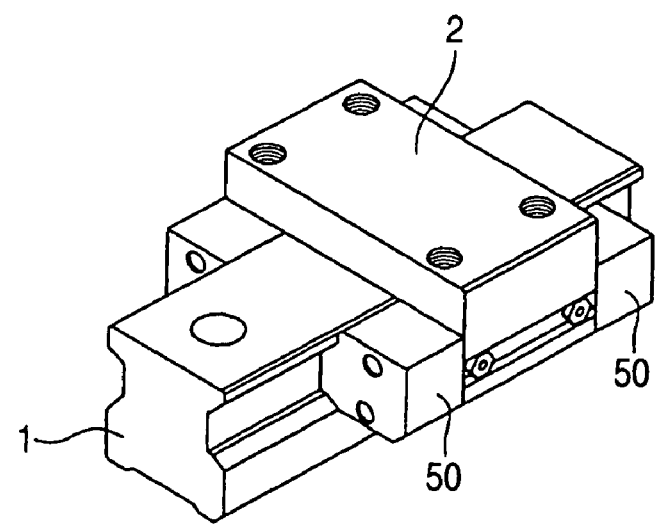
FIG. 14 is a perspective view showing a linear guide apparatus.

Further, in FIG. 11 through FIG. 13, the amount of inclination is exaggeratingly displayed.

It can be measured whether the predetermined inclination is provided to the track face worked as described above by the following method.

Figure 6:
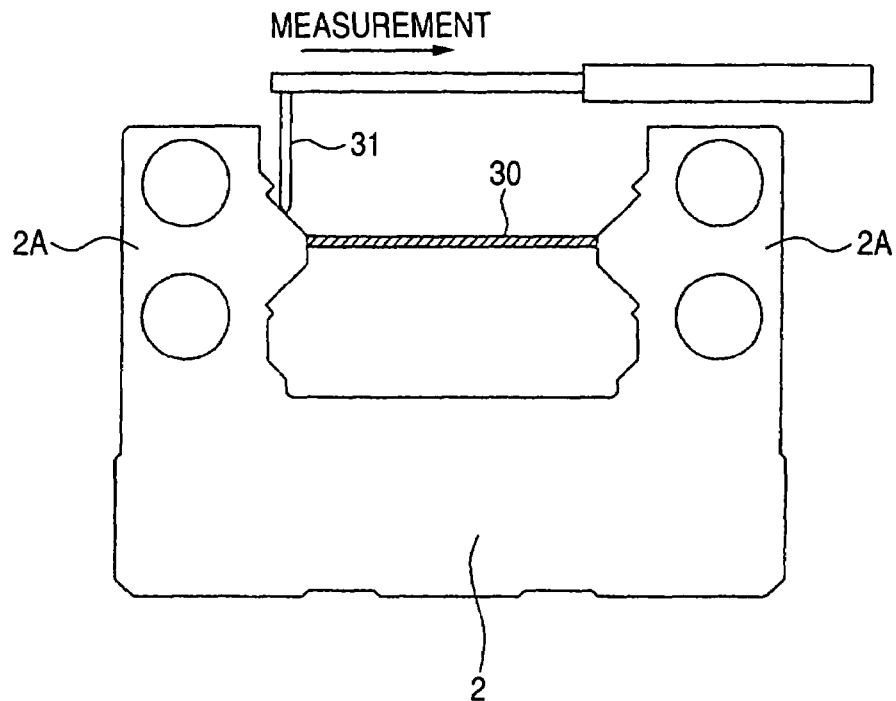
FIG. 6 is a view showing an example of a measuring method according to the embodiment.

That is, as shown by FIG. 6, a first measuring method is a method of measuring the shape of the left and right track faces of either one of the upper side and the lower side track faces. The left and right track faces are measured by a shape measuring instrument by bringing a measuring probe 31 into a supportable state by hanging a connecting member 30 comprising a paper piece or the like to span the left and right leg portions 2A. Further, the initial inclined angle is provided by an angle constituted by the left and right track faces. Further, although according to the method, only the lower side track face can be measured, the shape of the dresser can be ensured with high accuracy. Therefore, when the required initial inclined angle is provided to the lower side track face, also the upper side track face may be regarded to be provided with the required initial inclined angle.

Figure 7:
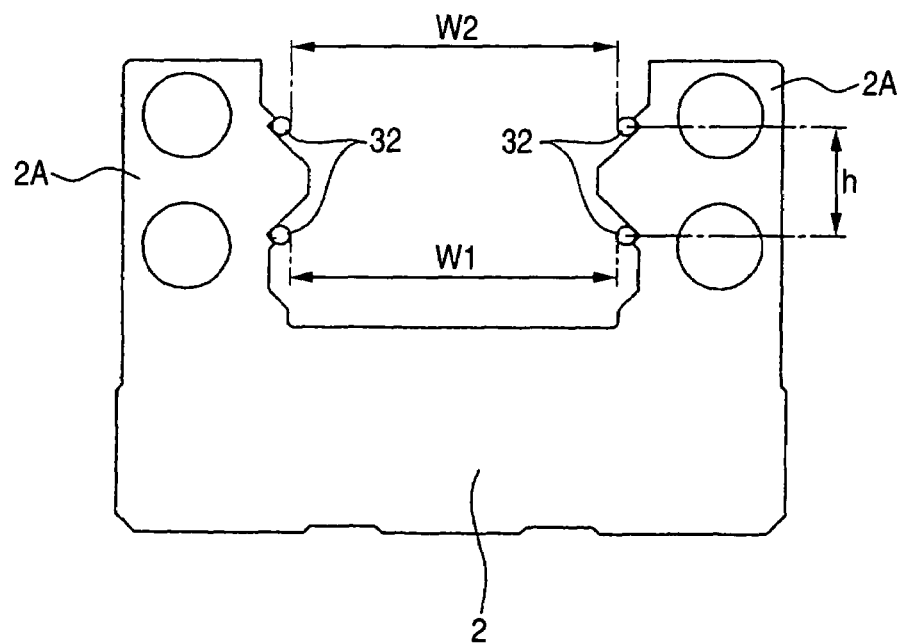
FIG. 7 is a view showing another example of a measuring method according to the embodiment.

FIG. 7 shows a second measuring method. With regard to the upper and lower track faces, measuring rollers 32 are brought into contact with recess portions respectively constituted by the track faces and flange portions and distances W1 and W2 between the left and right rollers 32 are measured. When a distance between the upper and lower rollers 32 is designated by notation h, the inclined angles of the track faces are known from $\theta=(W2-W1)/2h$. The flange portions are constituted only at the track faces on the side of the slider 2. Therefore, it is convenient for the linear guide apparatus of the type that the inclinations are provided only by the track faces on the side of the slider 2. Generally, when the flange portion is provided, the shape of dresser becomes complicated and cost is increased. Therefore, it is preferable to provide the flange portion to only one of the slider 2 or the guide line 1. Further, it is preferable to provide the inclined angles only to the member provided with the flange portions.

As has been explained above, when the present invention is adopted, the running life of the linear guide apparatus can be prolonged.

What is claimed is:

1. A linear guide apparatus comprising:
a guide rail including a track face extended in an axial direction;
a slider including a track face opposed to the track face of the guide rail and movable relative to the guide rail; and
a plurality of cylindrical rollers being interposed between the track faces opposed to each other by being applied with a predetermined preload and being rolled in accordance with a relative movement of the slider to the guide rail,
wherein one of the track faces opposed to each other is inclined to the other of the track faces relatively in an initial state of no load in which the cylindrical rollers are not interposed between the track faces by an inclined angle which cancels or reduces an amount of inclination of the track faces by a deformation of a member such that the track faces opposed to each other are in parallel with each other or substantially in parallel with each other in a state in which the member is deformed by being loaded with at least one of an external load to be loaded in using the linear guide and the preload.

2. A linear guide apparatus comprising:
a guide rail including a track face extended in an axial direction;
a slider including a track face opposed to the track face of the guide rail and movable relative to the guide rail; and
a plurality of cylindrical rollers being interposed between the track faces opposed to each other by being applied with a predetermined preload and being rolled in accordance with a relative movement of the slider to the guide rail,
wherein at least one of the track faces is inclined from a reference track face in an initial state of no load in which the cylindrical rollers are not interposed between the track faces by an inclined angle which cancels or reduces an amount of inclination from the reference track face produced by a deformation of a member by being loaded with at least one of an external load to be loaded in using the linear guide and the preload.

* * * * *